April 14, 1936.  A. W. EMPSON  2,037,218
SEPARATION OF COLLOIDAL AND OTHER SUSPENDED MATTER FROM OILS
Filed Feb. 12, 1932   3 Sheets-Sheet 1
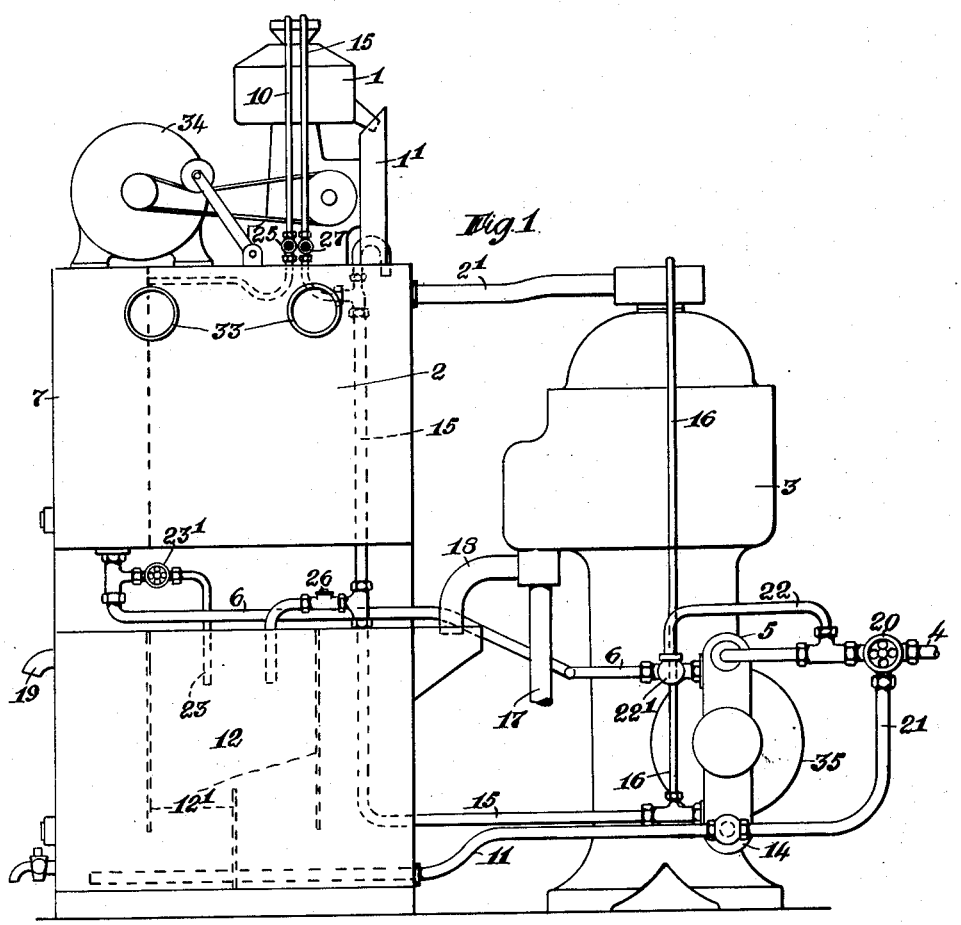
Inventor,
Alfred Walker Empson,
By Sommers & Young. Attys.

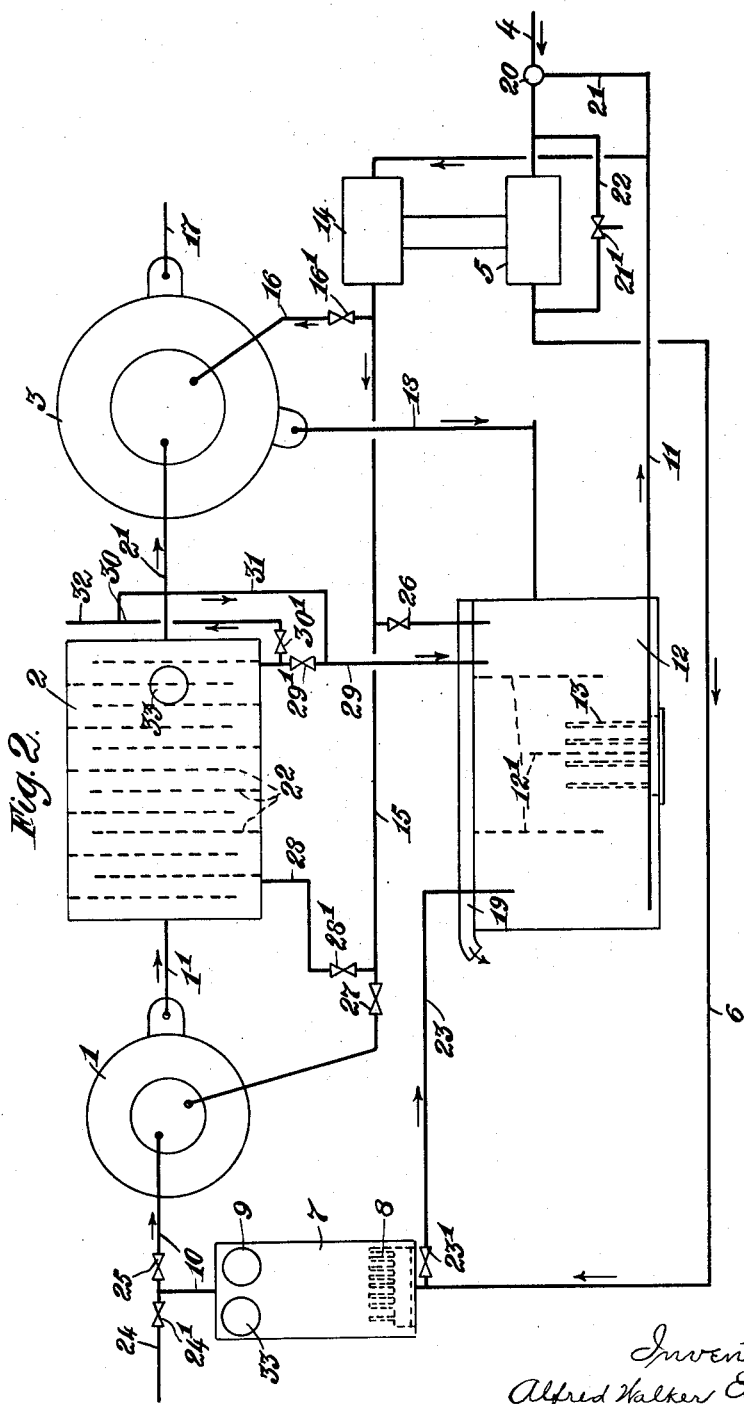

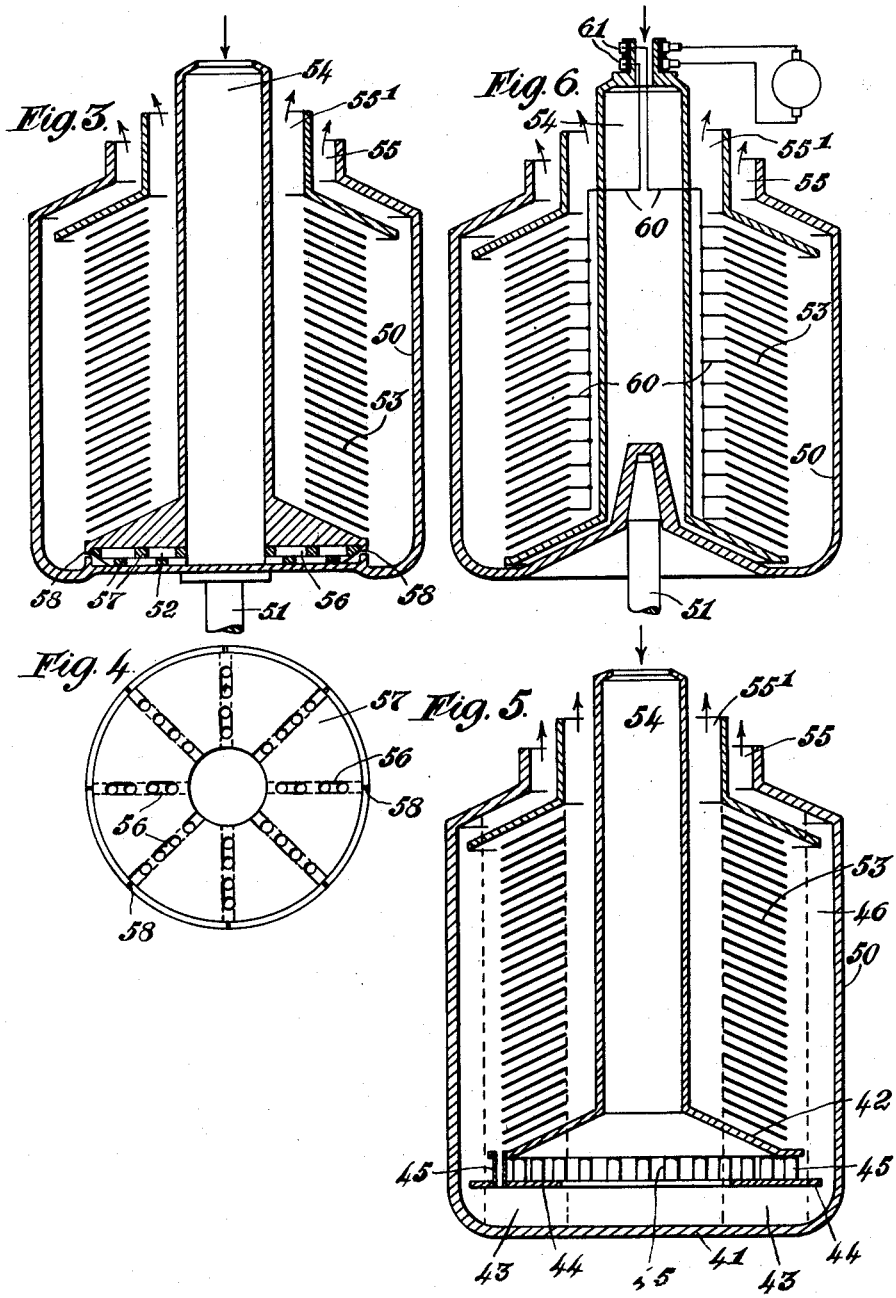

Patented Apr. 14, 1936

2,037,218

UNITED STATES PATENT OFFICE 2,037,218

SEPARATION OF COLLOIDAL AND OTHER SUSPENDED MATTER FROM OILS

Alfred Walker Empson, Gunnersbury, London, England, assignor to J. Stone & Company Limited, Deptford, England, a corporation of Great Britain Application February 12, 1932, Serial No. 592,584
In Great Britain March 9, 1931

4 Claims. (Cl. 210—48)

This invention comprises improvements in and connected with the separation of colloidal and other suspended matter from oils, for example, the re-conditioning of lubricating and insulating oils.

The invention principally relates to a treatment for effecting the coalescence or coagulation of colloidal matter, as for example, the finely divided or colloidal carbon which forms or appears in lubricating oils used in internal combustion or other engines and in insulating oil in electrical switch gear and other electrical apparatus. In this state the carbon cannot be retained on an ordinary filter and will not precipitate under the action of gravity or satisfactorily separate under the action of even high centrifugal force. To render separation possible by filtration, gravitation or centrifugal action, it is necessary to cause the fine particles to aggregate or coalesce and thus form tangible masses.

According to this invention, a relatively small quantity of water or steam is added to the contaminated oil, for example, and the mixture is submitted to intense agitation and turbulence under pressure so as to secure fine atomization and dispersion of the water in the oil and intimate contact between individual molecules or particles of oil, impurities and water. The impurities coalesce or aggregate so as to produce readily separable clots or tangible masses.

Provided a suitable apparatus is employed capable of thoroughly atomizing and dispersing an added foreign liquid in oil under treatment, it is possible, contrary to what has been held heretofore, to employ water alone as the foreign liquid and to avoid the employment of even small quantities or very dilute solutions of alkalies or chemicals for the purpose of facilitating and expediting the separation of oil from colloidal impurities. It is important to refrain from the addition of chemicals, such as alkalies, to oils which are to be reconditioned for use. Such additions have been employed in order to facilitate dispersion of the foreign liquid throughout the oil by means of an agitator. However, by the aid of apparatus adapted for producing fine atomization and agitation or turbulence in the mixing and dispersion of the foreign liquid in the oil, plain water can be used for the separation of colloidal matters from such oil with surprising results. In this connection, moreover, the invention is distinguished from washing or scrubbing processes in which oil in a state of subdivision is treated with relatively large quantities of water (e. g. 40 parts of water to 1 part of oil) such water preferably containing an addition of alkali. In the treatment according to these improvements a relatively small quantity of water is employed.

The oil and/or water may be heated prior to the treatment, particularly when the oil is in a viscous condition.

The improved treatment may be carried out in a centrifugal machine of the type described in the specification of U. S. Patent No. 1,770,302 granted to the said Alfred Walker Empson, but other apparatus adapted for producing atomization, agitation and turbulence under pressure may be employed.

After the treatment hereinbefore described it is advantageous, in many cases, to provide a time lag or delay before submitting the treated mixture of oil and water to a separating operation. Thus, before passing the treated mixture to a centrifugal separator, or filter, it may be received into what is called a time-lag tank wherein time is allowed for the development of the aggregation or clotting of the particles of carbon or other impurities. It is conceivable that, in some cases, a gravitational separation or mechanical filtration might be sufficient but, in practice, most installations would comprise a centrifugal separator adapted for effecting separation in an efficient and expeditious manner.

In addition to or in place of such time-lag treatment, the mixture may be submitted to electrical influences in order to render the water more readily separable from the oil.

In order that the invention may be more clearly understood, reference is directed to the accompanying drawings, in which: Figure 1 is a more or less diagrammatic elevation showing the general layout of an oil purifying installation; Figure 2 is a flow diagram for the same installation; Figure 3 is a cross-section of a combined coagulator and separator; Figure 4 is a plan view of the coagulator of Figure 3; Figure 5 is a cross section of a preferred form of centrifugal separator; and Figure 6 is a cross section of a centrifugal separator modified for the employment of electrical treatment.

Referring first of all to Figures 1 and 2, the installation, which is intended more particularly for use for purifying the lubricating oil employed in marine, vehicle or other engines, comprises in essentials a coagulator 1, a time-lag tank 2 and a separator 3. Dirty oil from a supply pipe 4 can be forced by a pump 5 through a pipe 6 to an oil-heating vessel 7 provided with an electric heater 8, controlled by a thermostat 9. The vessel 7 in turn communicates with the coagulator 1 by a pipe 10. Water taken through a pipe 11 from a water-storage tank 12 containing an electric heater 13 can be forced by a pump 14 through a pipe 15 to the coagulator 1, for mixture with the dirty oil as hereinafter explained. Advantageously the coagulator is a centrifugal device of the type described in the aforesaid Patent No. 1,770,302. Other forms of coagulator may be employed provided that they are capable of bringing about the required atomization of the water in the oil under conditions of great agitation and turbulence and under pressure.

The coagulator outlet 1' discharges into the time-lag tank 2 which may simply be a tank provided with baffles $2^2$ so disposed that in the time taken by the oil-water mixture to pass through said tank, the coagulation has progressed as far as is required. For some cases, such a time-lag tank may not be necessary and it may then be omitted or by-passed. The time-lag tank 2 communicates through a pipe 2' with the centrifugal separator 3 which may be a separator of known type. Water can be supplied to the separator 3 by a pipe 16 branching from the water supply pipe 15 and controlled by a cock 16'. Purified oil is led from one spout of the separator by a pipe 17 whilst water, contaminated by impurities, is led from the other spout through a pipe 18 to the water tank 12. The latter is provided with baffles 12' preventing direct flow between the pipes 18 and 11. An overflow or skimming trough 19 on the tank 12 allows the bulk of the carbon and other impurities carried out with the water from the separator to be floated off so that the water re-entering the pipe 11 for re-circulation is in a state of comparative purity.

To facilitate the working of the installation, the following further arrangements are provided: A three-way cock 20 is disposed between the dirty-oil supply pipe 4 and a pipe 21 communicating with the pipe 11 from the tank 12: A by-pass 22 across the oil-pump is controlled by a relief valve 21': A pipe connection 23 containing a cock 23' leads from the bottom of the oil heating tank 7 to the tank 12. An overflow pipe 24 with a cock 24' communicates with the hot oil supply pipe 10 which itself has a cock 25. The water supply pipe 15 has a relief valve 26 in a branch leading back to the tank 12 and is also provided with a cock 27. A further branch 28 containing a cock 28' leads to the lag tank 2: The latter has a drain pipe 29 with cock 29' leading to the tank 12. Above and below said cock 29' are pipes 30, 31, the former with a cock 30', communicating with a vent 32. The oil heater 7 and the time-lag tank 2 are provided with thermometers 33. An electric motor 34 is provided for driving the coagulator 1 whilst the separator 3 and pumps 5, 14 are driven from a second motor 35.

The mode of operation of this installation is as follows: The tank 12 is initially filled with boiling water which is maintained by the heater 13 at a temperature of 200-212° F. The separator and pumps are set in rotation and the valve 16' in the water supply to the separator is opened to warm the latter up, the water flowing back to the tank 12 through the pipe 18. Next, the coagulator is set in rotation and the valve 27 in its water supply is opened to warm it up. The water supply to the coagulator is then reduced until it becomes a small but continuous trickle. The overflow valve 24' is opened and the three-way cock 20 is slowly opened to connect the pump 5 to the dirty oil supply pipe. When oil is seen to discharge from the overflow 24, the heater 8 is switched on and the temperature of the oil watched until it reaches, say, 230° F., which is the temperature at which the thermostat operates automatically to shut off the heater. The overflow valve 24' is slowly closed and the valve 25 opened to allow the hot oil to pass into the coagulator. The valve 25 is adjusted to permit of an appropriate rate of oil-feed to the coagulator 1. If overflow takes place from the overflow-spout of the coagulator, the oil feed must be cut down.

For the majority of cases, the above instruction to supply a small but continuous trickle of water to the coagulator is sufficient to ensure successful operation. Naturally, for different purposes, some adjustment of the water feed may be necessary but under all ordinary circumstances said water feed will be of the order of from a fraction of one per cent to a few per cent of the oil feed.

The progress of the coagulation of the impurities in the water-oil mixture passing over into the time-lag tank 2 may be tested by examining a drop of treated oil on a glass slip held to the light. It should show clots of carbon within 2–3 minutes. As the mixture begins to overflow from the time-lag tank 2 into the separator 3, it is advisable to restrict the rate of flow until clear oil comes from the separator discharge 17. This can be effected by temporarily opening the drain valve 29' to drain off accumulated water and at the same time reducing somewhat the oil-feed to the coagulator. Once clean oil commences to be discharged, the rate of flow from the tank 2 to the separator 3 can be increased to a limit determined by the degree of oil-purity required. The water feed to the separator 3 should be adjusted to the minimum necessary to keep the drum thereof clear of coagulated carbon. The percentage varies with the amount of impurities to be removed and may, for example, be as low as 10% of the oil-water mixture from the tank 2. Darkening of the treated oil indicates that this water feed is being reduced too much. If it is found that water is accumulating in the lag tank, the valve 30' may be opened to establish an automatic overflow by way of the pipes 30, 31, 29, as otherwise the time lag would be curtailed.

To shut down the installation, the three way valve 20 is turned over so that water is drawn from the tank 12 through 11, 21 and delivered to the oil heater 7 to displace oil therefrom into the coagulator. The heaters are disconnected. The water is cut off at 27 when it appears at the outlet 1' of the coagulator, which is thereupon shut down. The water-oil mixture run into the time-lag tank 2 is displaced into the separator 3 by opening the cock 28' and admitting water to the tank 2 at a rate not exceeding the previous oil-feed rate. During this time it will be necessary to supply additional water to the tank 12. Also the drain cock 23' can be opened. When water appears at the separator inlet, indicating that all oil has been displaced from the tank 2, the separator is shut down and the drain 29' opened. The accumulated water in the tank 2 is drained slowly into the tank 12 where, owing to the water added, there will be an overflow at 19 which will carry away the floating dirt. The installation is then ready for restarting, and provided that the same grade of oil is to be treated at the next occasion, there should be no need to clean either the coagulator or separator more often than once in several days running.

For some purposes, the coagulator and centrifugal separator may be combined. For example, as illustrated in Figure 3, the combined apparatus could consist of a hollow drum 50 mounted on a spindle 51 driven at high speed by means of such as an electric motor, a coagulating device 52 mounted inside the drum and arranged to discharge the treated mixture against the inside of the drum-wall 50 and a series of spaced discs or cones 53 mounted inside and cencentric with the drum, the inlet 54 for the impure oil and the outlets 55, 55' for the water and impurities and for the purified oil being arranged and controlled as in ordinary centrifugal separators. In this arrangement, the coagulating device is of the type shown in the specification of the applicant's U. S. Patent No. 1,770,302, i. e. the liquid passes with very great agitation through tortuous passages 56 formed by separable slotted plates 57 and is finally ejected under centrifugal pressure through very fine radial outlets 58.

Although centrifugal separators of conventional types can be used or readily adapted for the present requirements, it is preferred to utilize a separator devised more especially to meet said requirements. The output capacity of a centrifugal separator is considerably reduced when it is required to deal with mixtures or emulsions of oil and water in addition to impurities. Increased input results in the delivery of an imperfectly separated or dehydrated oil from the oil spout, and of emulsion or mixed oil and water from the water spout. This imperfect separation is apparent, even when the oil and water entering the drum are not emulsified and, in fact, are in such an unstable state that they are capable of separating in a short time under the action of gravity alone.

It has been found that the imperfect result aforesaid is due to the re-mixing of oil and water taking place at or near what should be the line of demarcation between oil and water in the centrifugal drum. The result is that the restricted space between the outer edges of the separator cones and the water line is called upon to deal with the relatively large percentage of water.

To overcome this difficulty, additional space is provided inside the drum adjacent to the inlet, in which space easily separable water and dirt or impurities may leave the incoming mixture and flow direct to the water space surrounding the cones, and ducts or passages are provided to afford communication between such additional space and the oil space in and immediately around the cones, whereby the oil, freed from the bulk of its contained water can flow through such ducts to the oil space without re-mixing with the water.

As illustrated by way of example in Figure 5, the additional space is provided at the bottom of an axial inflow 54 by making the bottom 41 of the drum flat and further removed from the bottom cone 42 instead of conical, parallel and adjacent to the cones. In the additional annular bottom space 43 thus created, an annular baffle plate 44 is supported with its outer circular edge extended just beyond the water line and its inner circular edge just outside of the oil line or so-called level. The peripheral portion of the lowermost cone 42 is preferably horizontally extended in like manner to constitute an upper baffle. Tubes 45 are fixed between the peripheral parts of the baffles 44, 42 thereby opening communication between the additional space 43 beneath the lower baffle and the space above the upper baffle. Thus, mixed oil and water entering the axial inlet 54 descends towards the bottom of the drum and passes into the space between the baffles. The easily separated water content of this mixture is at once induced to flow between the tubes 45 direct to the water space surrounding the revolving cones, leaving easily separated oil trapped within the water line, but free, under the induced pressure, to pass over the inner edge of the lower baffle 44 into the space beneath. From such space this oil has direct access to the space between the lowermost cones, by way of the tubes 45 hereinbefore described. The space 46 immediately surrounding the peripheries of the cones, is thus only called upon to carry and distribute that portion of the water which is more or less emulsified with oil and which, in the majority of cases, is a very small percentage.

In this form of separator which forms the subject of my co-pending patent application No. 653,727 filed January 26, 1933, there is avoidance of the useless creation of fresh emulsion in the machine itself. This is due to the fact that, by the means provided, a preliminary coarse separation of water takes place with guidance of the constituents so separated directly into their appropriate paths.

It may be desirable to subject the mixture to preliminary electrical treatment, in addition to or in place of the time-lag treatment, before passing it to the separating device.

For this purpose the mixture may be subjected to the action of the field produced by a pulsatory current, for example by passing the liquid between a series of spaced plates insulated from one another and connected alternately to opposite terminals of the current supply, the construction being similar to that of a condenser. It is not essential that the liquid should be in direct contact with the plates and the latter may be sheathed in insulation. The particles of the disperse phase coalesce under the influence of the electrical field into large drops which are susceptible to separation by centrifugal force or gravity.

If desired the cones or plates of the centrifugal separator of the apparatus, e. g. the cones 53 of Figure 6, may be arranged to form the active electrodes between which the liquid is passed, said cones or plates being insulated from one another and alternately connected with opposite terminals of the current supply through leads 60, slip rings 61 and brushes outside the separator drum 50.

In so treating such suspensions, it has been found that each individual suspension is particularly susceptible to a certain optimum frequency at which it is broken with the least expenditure of time and energy. The treatment may be carried out either with alternating current or with uni-directional pulsating current, regulating means being provided in association with the treatment apparatus for enabling the frequency of the alternations or pulsations to be varied, and preferably also for enabling the applied voltage to be varied. In cases where the effect of cataphoresis is of advantage in addition to that of pulsatory current, uni-directional pulsating current may be employed, the direction of the current through the suspension being arranged to assist the migration of the disperse phase particles in the direction in which they are also influenced to travel under gravitational or centrifugal force.

In the preliminary treatment of some suspensions, the action of cataphoresis alone may be applied by passing the liquid between a series of plates alternately connected to direct current terminals. For this purpose also, a static form of apparatus may be employed or the plates may form an integral part of the centrifugal separator as shown in Figure 6.

Where the plates or cones of a centrifugal separator are utilized for such electrical treatments as in Figure 6, the necessary electrical energy may be supplied from the electric motor driving the separator, for example, in the case of a direct current motor, from slip rings connected to the armature windings in known manner so as to deliver alternating current, such current being then modified in regard to voltage and frequency as may be desired, with or without rectification.

It is to be understood that the invention is not limited in its use to the particular example of oil purification hereinbefore described, but that it may be applied for use in connection with the separation of particles from oils in other mixtures, solutions or suspensions which are not capable of efficient separation by ordinary centrifugal or gravitational methods.

I claim:

1. Method of freeing an oil from solid suspended matter of a substantially colloidal order of fineness, comprising dispersing in the oil a relatively small quantity of plain water in a highly atomized state by passing the oil and water together through relatively small labyrinthine ducts at high velocity, the dispersion being thereby effected under such conditions of pressure, intense agitation and turbulence that the dispersed particles of water have extreme intimacy with particles of suspended matter and produce aggregation of such latter particles, and separating the water together with the aggregated particles of suspended matter from the oil.

2. Apparatus for the separation of finely divided carbon from oil, comprising a centrifugal coagulating device having automizing means in the form of confined labyrinthine ducts for dispersing water in the oil under conditions of intense agitation and pressure, a time lag vessel, comprising a tank furnished with baffles, connected to said coagulating device, in which vessel aggregation of the carbon particles initiated in the coagulating device is completed, and a centrifugal separator connected to said time lag vessel to receive the water-in-oil dispersion therefrom and adapted for separating the water and coagulated carbon from the oil.

3. Method of freeing an oil from solid suspended matter of a substantially colloidal order of fineness, comprising dispersing in a highly atomized state in the oil a small quantity, but not more than a few per cent of the quantity of oil, of plain water without chemical addition, the dispersion being effected by finely subdividing the oil and water and subjecting the same to intense agitation under pressure whereby aggregation of the suspended matter is caused, and separating the water and aggregated matter from the oil.

4. Method of freeing an oil from solid suspended matter of a substantially colloidal order of fineness, comprising dispersing in a highly atomized state in the oil a small quantity, but not more than a few per cent of the quantity of oil, of plain water without chemical addition, the dispersion being effected by passing the mixture while under pressure through a small passageway whose direction changes abruptly and under pressure whereby aggregation of the suspended matter is caused, allowing the dispersion to remain substantially undisturbed to permit of completion of the aggregation, and separating the water and aggregated matter from the oil.

ALFRED WALKER EMPSON.